United States Patent
Vaks et al.

(10) Patent No.: US 10,199,976 B2
(45) Date of Patent: Feb. 5, 2019

(54) VIBRATION AND NOISE MANIPULATION IN SWITCHED RELUCTANCE MACHINE DRIVETRAINS

(71) Applicant: Continuous Solutions LLC, Portland, OR (US)

(72) Inventors: Nir Vaks, Portland, OR (US); Nyah Zarate, Portland, OR (US); Xiaoqi Wang, Beaverton, OR (US)

(73) Assignee: Continuous Solutions LLC, Portland, OR (US)

( * ) Notice: Subject to any disclaimer, the term of this patent is extended or adjusted under 35 U.S.C. 154(b) by 0 days.

(21) Appl. No.: 15/994,979

(22) Filed: May 31, 2018

(65) Prior Publication Data

US 2018/0351496 A1 Dec. 6, 2018

Related U.S. Application Data

(63) Continuation-in-part of application No. 15/601,823, filed on May 22, 2017, now Pat. No. 9,991,837.

(60) Provisional application No. 62/339,686, filed on May 20, 2016.

(51) Int. Cl.
| | |
|---|---|
| *F28F 27/00* | (2006.01) |
| *G05B 5/01* | (2006.01) |
| *H02P 6/10* | (2006.01) |
| *H02P 25/098* | (2016.01) |
| *H02P 6/16* | (2016.01) |
| *H02P 25/092* | (2016.01) |

(52) U.S. Cl.
CPC ............ *H02P 25/098* (2016.02); *F28F 27/00* (2013.01); *G05B 5/01* (2013.01); *H02P 6/10* (2013.01); *H02P 6/16* (2013.01); *H02P 25/092* (2016.02)

(58) Field of Classification Search
CPC ............... H02P 6/10; G05B 5/01; F28F 27/00
See application file for complete search history.

(56) References Cited

U.S. PATENT DOCUMENTS

| | | | |
|---|---|---|---|
| 4,961,038 | A | 10/1990 | MacMinn |
| 5,446,359 | A | 8/1995 | Horst |
| 5,461,295 | A | 10/1995 | Horst |
| 5,852,355 | A | 12/1998 | Turner |
| 5,923,141 | A | 7/1999 | McHugh |
| 6,359,413 | B1 | 3/2002 | Schulz et al. |
| 6,498,447 | B2 | 12/2002 | Mann et al. |
| 6,646,407 | B2 | 11/2003 | Rahman et al. |
| 6,922,036 | B1 | 7/2005 | Ehsani et al. |
| 7,009,360 | B2 | 3/2006 | Jin-Woo et al. |
| 7,117,754 | B2 | 10/2006 | Neely et al. |
| 7,119,512 | B2 | 10/2006 | Green |
| 7,885,785 | B1 | 2/2011 | Pekarek et al. |
| 8,018,193 | B1 | 9/2011 | Pekarek et al. |
| 8,080,969 | B2 | 12/2011 | Koening |
| 9,236,820 | B2 | 1/2016 | Mikail et al. |

(Continued)

*Primary Examiner* — Kawing Chan
*Assistant Examiner* — Cortez Cook
(74) *Attorney, Agent, or Firm* — Kolitch Romano LLP

(57) ABSTRACT

Systems and methods are disclosed for manipulating the noise and vibration of a switched reluctance machine (SRM). By use of vibration sensors and real-time optimization methods, the noise and vibration profile of an SRM and associated load may be modified to meet one or more control objectives, such as torque ripple mitigation (TRM), harmonic spectrum shaping, and/or efficiency improvement.

28 Claims, 8 Drawing Sheets

(56) References Cited

U.S. PATENT DOCUMENTS

| | | |
|---|---|---|
| 2002/0109476 A1 | 8/2002 | Kim |
| 2006/0038531 A1 | 2/2006 | Wakabayashi et al. |
| 2014/0210388 A1 | 7/2014 | Ito et al. |
| 2015/0207439 A1 | 7/2015 | Ye et al. |
| 2016/0069624 A1* | 3/2016 | Rollins ................. F04D 25/028 415/122.1 |
| 2016/0105135 A1 | 4/2016 | Torrey |

* cited by examiner

VIBRATION AND NOISE MANIPULATION IN SWITCHED RELUCTANCE MACHINE DRIVETRAINS

FEDERALLY SPONSORED RESEARCH OR DEVELOPMENT

The invention described herein was made with government support under U.S. Army Contract W56HZV-15-C-0192. The government of the United States of America may have certain rights in the invention.

FIELD

This disclosure relates to systems and methods for switched reluctance machine (SRM) controls, and in particular to systems and methods for mitigating and/or manipulating the noise and vibration produced by an operating SRM.

INTRODUCTION

Over recent decades, the switched reluctance machine has gained much attention in academia, industry, and defense. SRMs have advantages over competing motive technologies, including low production costs due to simple geometry, relatively low material costs, durability in harsh conditions, and tolerance to phase winding faults. Nevertheless, SRMs can be prone to excessive vibration and acoustic noise, generated by a variety of sources including structural deformation, magnetic torque harmonics resulting from the stator-rotor interaction, machine imbalances, and load-induced imbalances. Vibration can reduce the lifetime of drivetrain and the surrounding components. In addition, the resulting noise may be bothersome to the user and environment, and in some cases indicate the signature of the source of noise.

Known systems and methods of vibration and noise manipulation in SRMs are not entirely satisfactory for the range of applications in which they are employed. Previous research has been conducted on control methods of torque ripple mitigation (TRM) in SRMs. Existing methods of TRM in SRMs are directed to open-loop control, in which a look-up table based on machine characterization of an ideal SRM model is created offline and used to modify the current profile to mitigate the torque ripples. However, as open-loop control is predominantly accomplished using parameters that are predetermined prior to implementation, such control has the main drawback of being sensitive to machine parameter variations that arise after the machine characterization has been implemented. This is a critical problem for open-loop control of SRMs, as SRMs are subject to relatively large parameter deviations in implementation and use, due to the use of relatively cheap materials, operation over wide range of flux densities, and the nonlinear relationship between current waveform and flux density as a function of the rotor position. Therefore, open-loop control that is based on the knowledge of model SRM parameters can become much less effective in reality.

This problem can be somewhat mitigated by using parameters measured for each SRM with its specific load in place. However, such a technique would then limit controller use to the specific SRM and load combination; if any components of the driveline are changed, the parameters would need to be recomputed and the controller updated. Because of this, determining parameters for each specific SRM-load combination is not realistic for applications requiring the mass deployment of SRMs or where interchangeability of components is desired.

In contrast to open-loop control, closed-loop control uses vibration or noise measurement feedback as a direct input into the controller, replacing the offline calibrated look-up table. Closed-loop controllers provide benefits such as immunity to machine parameter deviation, real-time monitoring of the SRM's vibratory (or noise) profile, and the ability to implement optimization methods to enable tuning of the SRM while running. However, existing closed-loop controls tend to be less responsive and less robust at transients resulting from load changes, as the step size in the optimization method requires fine tuning at different load conditions beyond the capabilities of existing closed-loop systems. Moreover, the existing current harmonic profiling techniques can only mitigate torque ripples with a harmonic order number higher than the phase number. Existing closed-loop controllers have no control over lower frequency torque ripples, such as first- and second-order harmonics. In addition, existing closed-loop control has been applied only for TRM of permanent magnet synchronous machines (PMSMs), including brushless DC motors (BDCMs). The inverter topology and system matrices are fundamentally different for a PMSM/BDCM in comparison to an SRM.

SUMMARY

The present disclosure provides systems, apparatuses, and methods relating to vibration and noise manipulation in switched reluctance machine drivetrains.

In some embodiments, a method for mitigation of machine-induced vibration and noise in a switched reluctance machine drivetrain may include: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; determining an angular position of the rotor using an angular position sensor; receiving phase current feedback from a current measurement device coupled to stator windings of the SRM; extracting torque harmonic information from the measured machine-induced vibrations, based on the angular position of the rotor; estimating a base current, based on the phase current feedback and the angular position of the rotor; calculating an electromechanical imbalance factor from the base current and the torque harmonic information; and automatically modifying the machine-induced vibrations by incorporating, using the controller, the electromechanical imbalance factor into the drive current.

In some embodiments, a method for mitigation of machine-induced vibration and noise in a switched reluctance machine drivetrain may include: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; receiving phase current feedback from a current measurement device coupled to stator windings of the SRM; receiving phase voltage feedback from a voltage measurement device coupled to the stator windings of the SRM; calculating an angular position of the rotor based on the phase current feedback and phase voltage feedback; extracting torque harmonic information from the measured machine-induced vibrations, based on the angular position of the rotor; estimating a base current, based on the phase current feedback and the angular position of the rotor; calculating an electromechanical imbalance factor from the base current and the torque harmonic information; and automatically modifying the machine-induced vibrations by incorporating, using the controller, the electromechanical imbalance factor into the drive current.

In some embodiments, a method for mitigation of machine-induced vibration and noise in a switched reluctance machine drivetrain may include: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; determining an angular position of the rotor using an angular position sensor; receiving phase current feedback from a current measurement device coupled to stator windings of the SRM; extracting torque harmonic information from the measured machine-induced vibrations, based on the angular position of the rotor; estimating a base current, based on the phase current feedback and the angular position of the rotor; determining a harmonic current command by performing a gradient descent analysis to minimize a cost function, wherein the cost function is based on the torque harmonic information; and automatically modifying the machine-induced vibrations by incorporating, using the controller, the harmonic current command into the drive current.

In some embodiments, a method for mitigation of machine-induced vibration and noise in a switched reluctance machine drivetrain may include: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; receiving phase current feedback from a current measurement device coupled to stator windings of the SRM; receiving phase voltage feedback from a voltage measurement device coupled to the stator windings of the SRM; calculating an angular position of the rotor based on the phase current feedback and phase voltage feedback; extracting torque harmonic information from the measured machine-induced vibrations, based on the angular position of the rotor; estimating a base current, based on the phase current feedback and the angular position of the rotor; determining a harmonic current command by performing an gradient descent analysis to minimize a cost function, wherein the cost function is based on the torque harmonic information; and automatically modifying the machine-induced vibrations by incorporating, using the controller, the harmonic current command into the drive current.

Features, functions, and advantages may be achieved independently in various embodiments of the present disclosure, or may be combined in yet other embodiments, further details of which can be seen with reference to the following description and drawings.

DETAILED DESCRIPTION

Figure 1:
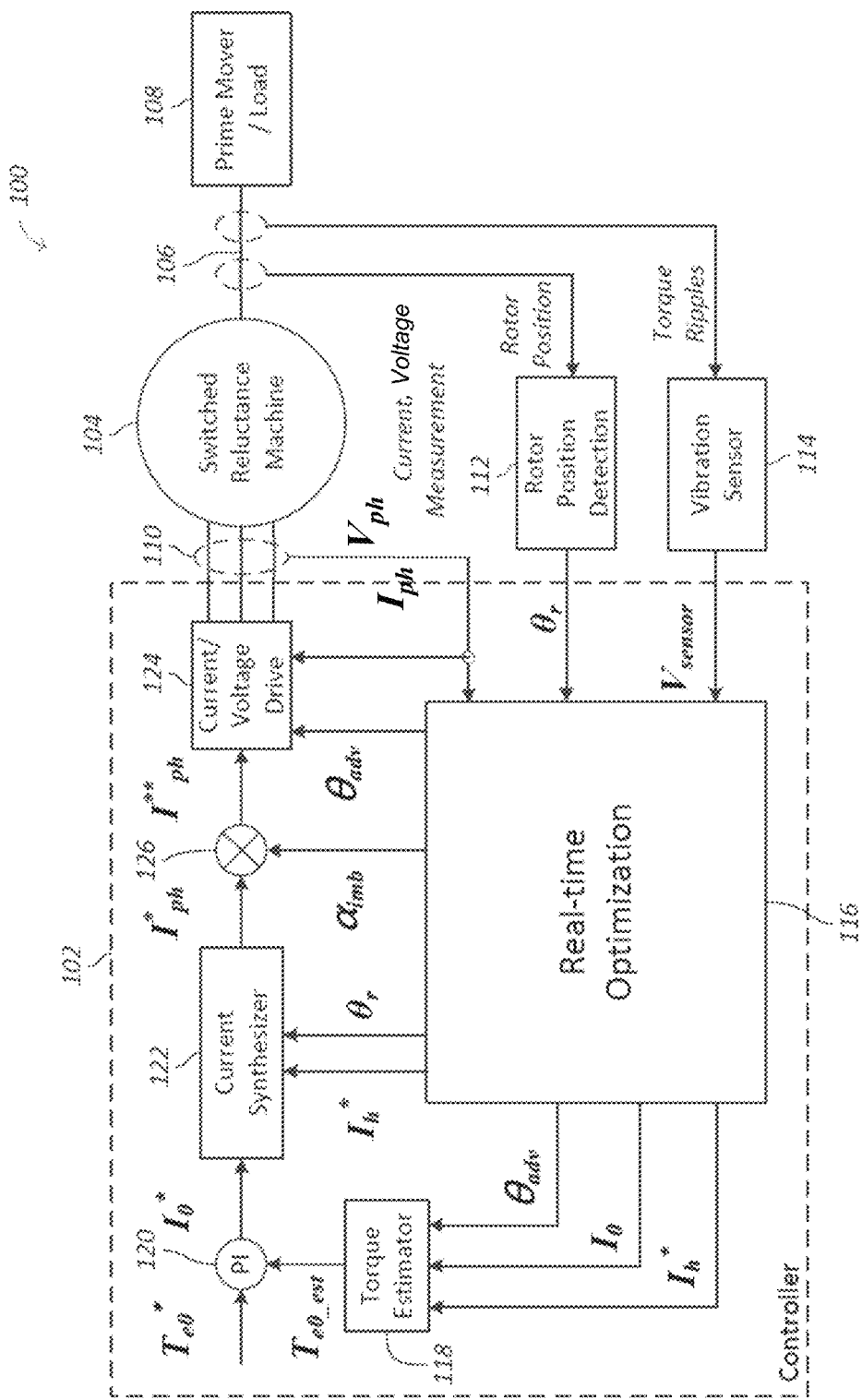
FIG. 1 is a block diagram of an illustrative controller implementing methods for vibration and noise manipulation for a switched reluctance machine as disclosed herein.

Various aspects and examples of systems for SRM noise and vibration manipulation, as well as related methods, are described below and illustrated in the associated drawings. Unless otherwise specified, an SRM noise and vibration manipulation system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; and (4) Conclusion. The Examples, Components, and Alternatives section is further divided into subsections A through C each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components, and is not necessarily limited to physical connection(s).

"Processing logic" may include any suitable device or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Overview

Systems and methods disclosed herein include a closed-loop control algorithm for SRMs that performs vibration and noise manipulation, including torque ripple mitigation (TRM), in real-time. This algorithm can be implemented on an SRM controller. A real-time optimization module employing an adaptive gradient method enhances the responsiveness and robustness of the disclosed control methods during load transients. The real-time optimization process dynamically generates the optimal set of current harmonics, phase advancement angle, and electromechanical imbalance factor, despite machine parameter variations. The disclosed methods and systems can be utilized in high power, high pole count, and high speed applications, where SRMs have characteristics such as long ramp-up and fall-down times in phase current due to high machine inductance, and high electrical switching frequencies in high pole count and high speed implementations. In addition, the disclosed methods provide a solution to mitigate or manipulate low frequency (first and second order) torque ripple harmonics produced by parameter deviation between each phase and mechanical misalignment in the drivetrain.

Furthermore, the disclosed methods and systems can be utilized to manipulate, rather than minimize, the noise and vibration profile of not only the SRM, but the SRM in combination with its load. Previous research is focused only on the reduction of SRM vibration and noise induced by torque ripple. However, the same methods that can be used to reduce torque-induced harmonic vibrations, other machine-induced vibrations, and noise can be used instead to shape, rather than strictly reduce, the harmonic spectrum of the source. By reducing some harmonic orders and adding other harmonic orders, the noise signature of one object can be changed to represent or mimic the noise signature of another object. In addition, by introducing current harmonics, traditional TRM methods are subject to issues of increasing loss and exceeding hardware rating. In this invention, efficiency can be part of the optimization so that the generated current profile will lead the SRM to run at optimal conditions.

In general, systems and methods described herein provide a way to manipulate measured vibrations and/or noise generated by a switched reluctance machine (SRM) (either a motor or a generator), including the SRM and any associated load in the driveline. While in operation, an SRM and any attached load generates vibrations and/or noise due to various factors such as torque ripples, SRM mechanical imbalance, load imbalance, load changes, load cogging, and/or other similar factors. These vibrations and/or noise are measured using a vibration sensor, such as a piezoelectric sensor, accelerometer, or microphone, e.g., placed in proximity to the source of a particular noise or vibration. The sensor signal is processed through a real-time optimization module to determine the current profile for torque ripple mitigation (TRM), or for other control objectives such as harmonic spectrum shaping and efficiency improvement. A phase advancement angle is used to improve current tracking and performance in high power, high pole count, and high speed applications. An electromechanical imbalance factor is introduced to minimize low frequency torque ripple harmonics that are potentially caused by mechanical misalignment and electrical imbalance. The real-time optimization utilizes an adaptive algorithm to auto-tune the step size to achieve rapid responsiveness and strong robustness during load transient. The control scheme is applicable to both generating and motoring operation of the SRM.

Examples, Components, and Alternatives

The following sections describe selected aspects of exemplary SRM noise and vibration manipulation systems, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative System for SRM Vibration and Noise Manipulation

As shown in FIGS. 1-6 and 8, this section describes an illustrative system for vibration and noise manipulation for an SRM, generally indicated at 100. System 100 is an example of the systems described in the Overview above.

System 100 provides a controller for an SRM that implements the method for vibration and noise manipulation disclosed herein. The reader will appreciate from the figures and description below that system 100 addresses shortcomings of known systems.

Referring to FIG. 1, system 100 includes a controller 102 and an SRM 104 having a rotor 106 with a shaft. A prime mover or load 108, depending on whether SRM 104 operates as a generator or a motor, is coupled to the shaft of rotor 106. A current measurement device 110, a rotor position detection device 112, and a vibration sensor 114 are in electrical communication with controller 102, which includes processing logic for carrying out the functions described below. Although SRM 104 shown in FIG. 1 has three phases, the disclosed methods and controller 102 can be configured to work with any arbitrary number of phases and configurations of SRMs.

SRM 104 may include any suitable switched reluctance machine. Accordingly, within SRM 104, the stator and rotor have protruded geometry as poles, and there are windings around the stator poles. The rotor is comprised of a soft magnetic material. As current excitation is provided to the stator windings, the unaligned rotor poles are attracted to the energized stator pole to an aligned position, in which case torque is generated through this process. By sequentially switching the current into each stator phase winding so that the magnetic field leads the position of the rotor, the rotor rotates due to the electromagnetic torque created by the variation of reluctance and the controlled stator phase currents. Controller 102 receives rotor position feedback via rotor position detection device 112, which aids controller 102 in timing the switching between stator phases.

SRM 104 is mechanically coupled to a prime mover or a load via a shaft extending from rotor 106. As rotor 106 and its corresponding shaft rotate, mechanical energy is transferred via the shaft between load 108 and rotor 106 of SRM 104. Load 108 can be a prime mover when SRM 104 is in generating mode, or a driven load when SRM 104 is operated as a motor.

Current measurement device 110 includes one or more devices wired across the stator winding phases and configured to detect the electrical current flowing through each phase. Such measured currents are fed back to controller 102 to enable controller 102 to determine and calibrate the performance of SRM 104. For example, controller 102 may monitor and calibrate to ensure that a commanded torque is being delivered, as well as to detect potential electrical faults such as a short in the windings, or a stalled motor that could result in an over current condition within controller 102. Measured currents can also be used to detect the angular position of rotor 106, as detailed further below. Current measurement device 110 may be implemented using any known method of detecting and measuring current flow, such as detection coils. Such functionality may be implemented within controller 102, or as a discrete component or components external to controller 102.

To correctly and smoothly operate SRM 104, it is beneficial for controller 102 to know the angular position of rotor 106 at all times. Rotor position information $\theta_r$ obtained from rotor position detection device 112 is fed to controller 102 for use in timing stator winding excitation, as described herein. SRM 104 may be equipped with one or more rotor position detection devices 112, which may be implemented using an encoder, resolver, Hall-effect sensors, or any other suitable device that can accurately detect the angular position of rotor 106. In other embodiments, rotor position detection can be realized by sensorless techniques based on the feedback of the phase current (as detected by current measurement device 110) and voltage measurements $I_{ph}$ and $V_{ph}$, respectively, with appropriate calculations performed in controller 102. In such embodiments, a physical rotor position detection device 112 may be unnecessary.

It should be understood that "angular position sensing means" and "angular sensing means" (as used herein) correspond to any device or technique for determining the angular position of rotor 106, including the discrete detection device and/or the methods of determining rotor position described above, including phase current and voltage detection, back EMF measurement techniques, or any other device or method that provides a suitably accurate indication of the angular position of rotor 106. Such means function while SRM 104 is in operation, and are also fast enough to work with the timing requirements of controller 102 necessary to drive SRM 104 for its intended application.

In some examples, vibration sensor 114 is installed upon or in the proximity of SRM 104, to measure vibrations and noise produced by SRM 104. In some examples, vibration sensor 114 may be disposed at locations more proximate to or upon load 108, where manipulation of vibrations and/or noise experienced by the whole of system 100 is desired. Vibration sensor 114 is configured to transform the detected vibration and noise into a voltage signal. In some examples, vibration sensor 114 outputs a varying analog voltage signal corresponding to the amplitude of the measured vibrations and/or noise. Where vibration sensor 114 is placed on or proximate to SRM 104, the voltage signal will contain harmonic components that represent the torque ripple induced by SRM 104, as well as lower-order harmonics induced by machine and system imbalances. A conditioning circuit may be used to amplify and filter the direct output signal of vibration sensor 114, and to form the sensor signal $V_{sensor}$ that is fed to controller 102. This conditioning circuit may be implemented as part of controller 102, as part of vibration sensor 114, or as a discrete component.

As mentioned above, vibration sensor 114 may include one or more piezoelectric devices, microphones, Hall-effect sensors, accelerometers, gyroscopes, MEMS sensors, and/or any other suitable technology (e.g., transducer) configured to convert accurately-detected vibration and/or noise into a usable electrical signal. Moreover, system 100 may be equipped with multiple vibration sensors 114 to measure harmonics in multiple axes, and/or from multiple locations (e.g., at both SRM 104 and load 108).

Controller 102, as a closed-loop controller, receives an initial input (such as a torque command) from the user of system 100, and then drives the SRM based on the commanded torque in combination with measurement feedback. A goal of controller 102 is to achieve user commands and control objectives such as torque ripple mitigation (TRM) of the SRM. The controller receives the command of average torque $T_{e0}^*$. In addition, the controller receives the measurement feedback of phase currents $I_{ph}$, rotor position $\theta_r$, and vibration sensor signal $V_{sensor}$ that represents the torque ripple induced by the SRM. In response to these inputs, the controller regulates the phase currents in stator coils to generate the desired torque in the SRM.

Functional modules of controller 102 include a real-time optimization core 116, a torque estimator 118, a proportional-integral (PI) controller 120, a current synthesizer 122, and a current/voltage drive 124. These modules may be implemented in the processing logic of controller 102 and/or using any other suitable implementation technique, including in combination with existing power electronic drive boards. In some examples, controller 102 is implemented as a discrete electronic component, i.e., an electronic speed controller (ESC), which can be used with various SRMs so long as the phase configuration of controller 102 matches that of SRM 104 (e.g., three phase SRM to three phase controller). It should also be appreciated that controller 102 can be modified to drive SRM 104 with any arbitrary number of phases. In some examples, controller 102 is physically integrated with either SRM 104 or another component of the system.

Figure 2:
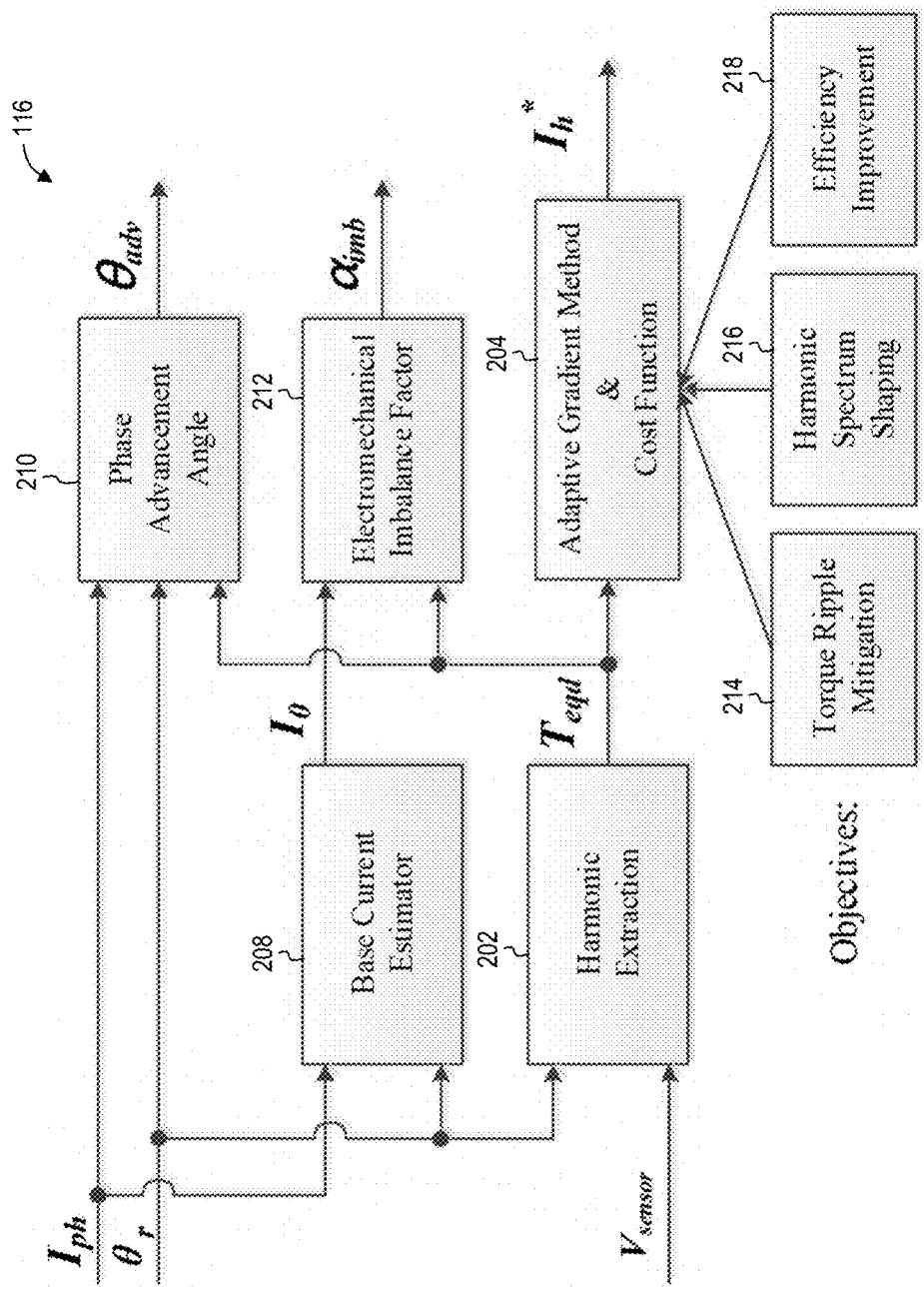
FIG. 2 is a block diagram of the controller of FIG. 1, depicting selected subcomponents of a real-time optimization module.

A detailed breakdown of selected module subcomponents of real-time optimization core 116 is depicted in FIG. 2. Real-time optimization core 116 function modules include a harmonic extraction module 202, an adaptive gradient method module 204, a base current estimator 208, a phase advancement angle module 210, and an electromechanical imbalance factor module 212. As with controller 102, real-time optimization core 116 may be implemented as processing logic, using discrete components, microprocessors, embedded controllers, ASICs, FPGAs, DSPs, and/or the like.

The following is a listing of the signal notation of the controller and each of the function modules depicted in FIGS. 1 and 2:

| Symbol | Description |
| --- | --- |
| $T_{e0}^*$ | Average torque command |
| $T_{e0\_est}$ | Estimated average torque |
| $I_0^*$ | Base current command |
| $I_0$ | Estimated base current |
| $I_h^*$ | Harmonic current command |
| $I_{ph}^{**}$ | Phase current command with correction |
| $I_{ph}^*$ | Phase current command |
| $I_{ph}$ | Phase current feedback |
| $\theta_{adv}$ | Phase advancement angle |
| $\theta_r$ | Rotor position feedback |
| $\alpha_{imb}$ | Electromechanical imbalance factor |
| $Te_{qd}$ | Torque harmonic content |
| $V_{sensor}$ | Vibration sensor signal |

In harmonic extraction module 202, the vibration sensor signal $V_{sensor}$ and rotor position $\theta_r$ are supplied as inputs, and the torque harmonic information $Te_{qd}$ is generated as an output. The sensor signal $V_{sensor}$ is effectively the result of the torque ripple passing through a transfer function, and the magnitudes of their harmonic components have a linear proportional relationship. By applying harmonic extraction methods (e.g., Fast Fourier Transform, Fourier Series Decomposition) to sensor signal $V_{sensor}$, torque harmonic content $Te_{qd}$ that represents the even and odd torque harmonics is obtained.

Within the harmonic extraction methods, the detected rotor position is used to calculate the cosine and sine values of the orders of harmonics that are of interest. In some examples, a leaky integrator method may be used to extract the harmonic components in a less computationally costly manner. The leaky integrator is a method to integrate the product of sensor signal $V_{sensor}$ and cosine (or sine) values that represent different harmonic components, such that the outcome of the leaky integrator is the integration of different harmonic components.

Because the respective even and odd components of specific harmonics are of interest, the sensor output is multiplied by sine and cosine functions of a particular frequency of interest, respectively. This leaky integrator uses a first-order filter with feedback to extract values that are attributed to the torque ripple with reduced sensitivity to noise outside of the frequency of interest. This is mathematically done such that:

$$Te_q = \int [v_{sensor} \cos(n\theta_r) - \varepsilon Te_q] dt$$

$$Te_d = \int [v_{sensor} \sin(n\theta_r) - \varepsilon Te_d] dt$$

where $Te_q$ is the even order torque ripple harmonic component, and $Te_d$ is the odd order torque ripple harmonic component, and n is the number of harmonic order, and $\varepsilon$ is a feedback parameter that is a constant.

While the foregoing refers to the extracted information as torque harmonics, it should be appreciated here and in the following discussions that these harmonics are not necessarily direct torque-induced vibrations coming from SRM 104, but instead any vibrations intended to be measured by vibration sensor 114, and will depend upon the disposition of vibration sensor 114. In some cases, the extracted information may relate to vibration harmonics resulting from the interaction of SRM 104 (and its torque- and imbalance-associated vibrations) with the load (and the imbalances and response to torque-induced vibrations of the load). In some cases, particularly when SRM 104 is configured to operate as a generator, the extracted harmonics may include torque-induced vibrations from a prime mover attached to the shaft of rotor 106.

Cost function(s) described herein may be optimized using any suitable method or algorithm. For example, optimization may proceed using Newton's Method, the Conjugated Direction Method, a family of Gradient methods, and/or the like. In the embodiment described below, optimization is performed using a variant of a steepest descent method, also referred to as a gradient descent analysis. This type of method includes a first-order iterative optimization algorithm for finding the minimum of a function (e.g., an error or cost function). To find a local minimum of a function using the gradient descent method, one takes "steps" proportional to the negative of the gradient (or of the approximate gradient) of the function at the current point. To formulate an algorithm to implement the above idea, suppose that we are given a point $x_k$. To find the next point $x_{(k+1)}$, we start at $x_k$ and move by an amount $-\alpha_k \nabla f(x_k)$, where $\nabla f(x_k)$ is the gradient of the cost function at point $x_k$, and $\alpha_k$ is a positive scalar referred to as the step size. The gradient varies as the search proceeds, tending to zero as we approach the minimum. The above procedure leads to the following iterative algorithm: $x_{(k+1)} = x_k - \alpha_k \nabla f(x_k)$ In adaptive gradient method module 204 of real-time optimization core 116, the torque harmonic content $Te_{qd}$ is provided as input from harmonic extraction module 202, and a harmonic current command $I_h^*$ is generated as output and provided to current synthesizer 122. The harmonic current command $I_h^*$ represents the even and odd current harmonics of different orders that are associated with the torque harmonics. The method of module 204 may be performed based on a selected control objective. To facilitate these control objectives, a torque harmonic command offset $Te_{qd}^*$ and current harmonic RMS constraint $C_{rms}$ may be included. One or both may be utilized as described below, based on the selected objective(s). For example, rather than strictly driving $Te_{qd}$ to zero, $Te_{qd}$ may be driven to $Te_{qd}^*$, which may (or may not) be set to zero.

The cost function to minimize torque ripple may take the following form:

$$f(\vec{i}) = (\vec{i}^T Q_{1q} \vec{i})^2 + (\vec{i}^T Q_{1d} \vec{i})^2 + (\vec{i}^T Q_{2q} \vec{i})^2 + (\vec{i}^T Q_{2d} \vec{i})^2 + \ldots$$

where $\vec{i}^T$ is the harmonic currents vector, and the Q matrices are system matrices that convert current to torque for different order harmonics and qd-axes. The system matrices are derived based on machine parameters. Although the machine parameters can be characterized at arbitrary load (unsaturated or saturated) conditions, the derived coefficients in the gradient method can be used for operation in any load condition. Thus the gradient $\nabla f(\vec{i})$ has an expression of the following, $$\nabla f(\vec{i}) = (Te_{1q} - Te_{1q}^*) Q_{1q} \vec{i} + (Te_{1d} - Te_{1d}^*) Q_{1d} \vec{i} + (Te_{2q} - Te_{2q}^*) Q_{2q} \vec{i} + (Te_{2d} - Te_{2d}^*) Q_{2d} \vec{i} + \ldots$$

Such a gradient function not only allows the optimization to drive $Te_{qd}$ to zero (when $Te_{qd}^*$ equals 0), but also drive $Te_{qd}$ to their desired values (when $Te_{qd}^*$ equal nonzero torque harmonic command offsets). Hence, the optimization process of the harmonic current to minimize the torque ripple harmonics becomes:

$$\vec{i}^{(k+1)} = \vec{i}^{(k)} - \alpha_k \nabla f(\vec{i}^{(k)})$$

subject to $\sqrt{\vec{i}^T \vec{i}} < C_{rms}$ where $C_{rms}$ is the harmonic current RMS value constraint, which will be applied to reduce machine copper loss and increase efficiency.

An adaptive auto-tuning algorithm based on the magnitude of the torque harmonic content $Te_{qd}$ is applied to find and tune the optimal step size for the gradient method, such that the direction and steepness of the convergence can be adjusted appropriately at various load conditions. The adaptive auto-tuning algorithm can be expressed as the following PI-based equation, such that as the torque ripple harmonics reduce, the step size will also reduce:

$$\alpha_k = k_p(\text{Max}(|Teqd|) - \alpha_k) + k_i \int (\text{Max}(|Teqd|) - \alpha_k) dt$$

Optimization may be directed toward one or more of various control objectives, including torque ripple mitigation 214 (TRM), harmonic spectrum shaping 216, and/or efficiency improvement 218. Based on the selected objective, optimization constraints including offsets $Te_{qd}^*$ and/or limits $C_{rms}$ are added to the commanded torque harmonics and/or to the commanded current harmonics. For example, torque ripple mitigation 214 may be selected as the priority objective for most applications where reduction of vibrations and noise resulting from the operation of SRM 104 is desired, with the gradient method proceeding as described above. However, other objectives can be selected as priorities. For example, when harmonic spectrum shaping 216 is selected as an objective, offsets $Te_{qd}^*$ are added to the commanded torque harmonics, so that the gradient method will drive the torque harmonics to the desired profile. Accordingly, the noise signature of one object can be changed to represent or mimic the noise signature of another object. In another example, when efficiency improvement 218 is the selected objective, the RMS values of the injected current harmonics are limited by $C_{rms}$, such that the generated current profile takes account for the RMS loss to meet user-defined efficiency constraints.

Accordingly, optimization methods described herein may include calculating a harmonic current command by performing a gradient descent analysis to minimize a cost function. The cost function is based on torque harmonic information, and the analysis may be performed based on a selected control objective. That control objective may include (1) TRM, in which case torque harmonic content is minimized, (2) harmonic spectrum shaping, in which case the SRM is biased toward a selected torque harmonic profile, and/or (3) efficiency, in which case the harmonic current command is limited to be less than a maximum selected value (e.g., a maximum allowable RMS value). The control objective may be determined using any suitable method. In some examples, the control objective may be hard-coded into the processing logic. In some examples, a user may select one or more control objectives manually, e.g., using selection buttons or the like in a graphical user interface of the controller. In some examples, other variables such as an efficiency limit (e.g., a harmonic current command limiter) and/or torque harmonic profile may also be user-selectable.

The TRM control objective is generally configured to reduce all torque harmonics as much as possible. Conversely, harmonic shaping is generally configured to create harmonics as commanded. Accordingly, these two objectives may be precluded from being selected simultaneously. However, other objectives, such as TRM and efficiency, may be pursued simultaneously (with trade-offs). For example, the controller may reduce the total harmonics to a level at which the efficiency meets its constraint.

In base current estimator module 208, the phase current feedback $I_{ph}$ and rotor position $\theta_r$ are provided as inputs, and the estimated base current $I_0$ is calculated as output. The rotor position $\theta_r$ is used to identify the excitation windows that define the beginning and ending moments for each phase excitation. The estimated base current $I_0$ is calculated from the mean value of the phase current within the excitation window.

In phase advancement angle module 210, the phase current feedback $I_{ph}$, rotor position $\theta_r$, and the torque harmonic content $Te_{qd}$ are provided as inputs, and the phase advancement angle $\theta_{adv}$ is generated as output. The phase current cannot change instantaneously from turn-on to desired value, or vice versa. Accordingly, in an inductive circuit, the actual current waveform has a "tail" when it rises and falls. Particularly, for high power, high pole count, and high speed applications, the tail is relatively long due to high inductance and high electrical frequency. The phase advancement angle $\theta_{adv}$ is A applied such that the phase current reaches desired value and contains critical current harmonic content, especially when current harmonics are present. The phase advancement angle $\theta_{adv}$ is added only to the beginning of the excitation window of each phase. Therefore, it simplifies and accelerates the real-time auto-tuning process in order to receive optimal current tracking.

In electromechanical imbalance factor module 212, the torque harmonic content $Te_{qd}$ and the estimated base current $I_0$ are provided as input, and the electromechanical imbalance factor $\alpha_{imb}$ is generated as output. Due to the deviation of machine parameters, including physical variations introduced in the materials and construction of SRM 104, even with the identical phase current, the torque production in each phase can be different, with slight variances. This imbalance introduced by parameter deviation and the mechanical misalignment in the drivetrain can create additional low frequency (e.g., first or second order) torque ripple harmonics in the system. The electromechanical imbalance factor $\alpha_{imb}$ is calculated based on instant feedback of the torque ripples, and used to compensate for the imbalance in electrical domain and mechanical domain. Unlike most electric machines (e.g., PMSMs and induction machines where phase windings are inter-connected), each phase in SRM 104 is independent from the others. Accordingly, an imbalanced set of phase currents can be applied to counteract first and second order vibrations stemming from sources other than torque ripple.

The algorithm described above to generate the electromechanical imbalance factor may include the following steps. In a first step, the magnitude of the first- and second-order torque harmonic information $Te_{1st}$ and $Te_{2nd}$ are calculated based on the output of the harmonic extraction module. In a second step, the imbalance torque content $Te_{imb}$ is calculated by feeding the sum of $Te_{1st}$ and $Te_{2nd}$ into a slew rate integrator, which has the following expression:

$$Te_{imb} = k_{imb} \int (Te_{1st} + Te_{2nd} - Te_{imb}) dt$$

where $k_{imb}$ is an integration coefficient that is determined by the base current using a lookup table. In a third step, the imbalance torque content $Te_{imb}$ is fed into a state machine to generate the imbalance factor $\alpha_{imb}$.

Figure 8:
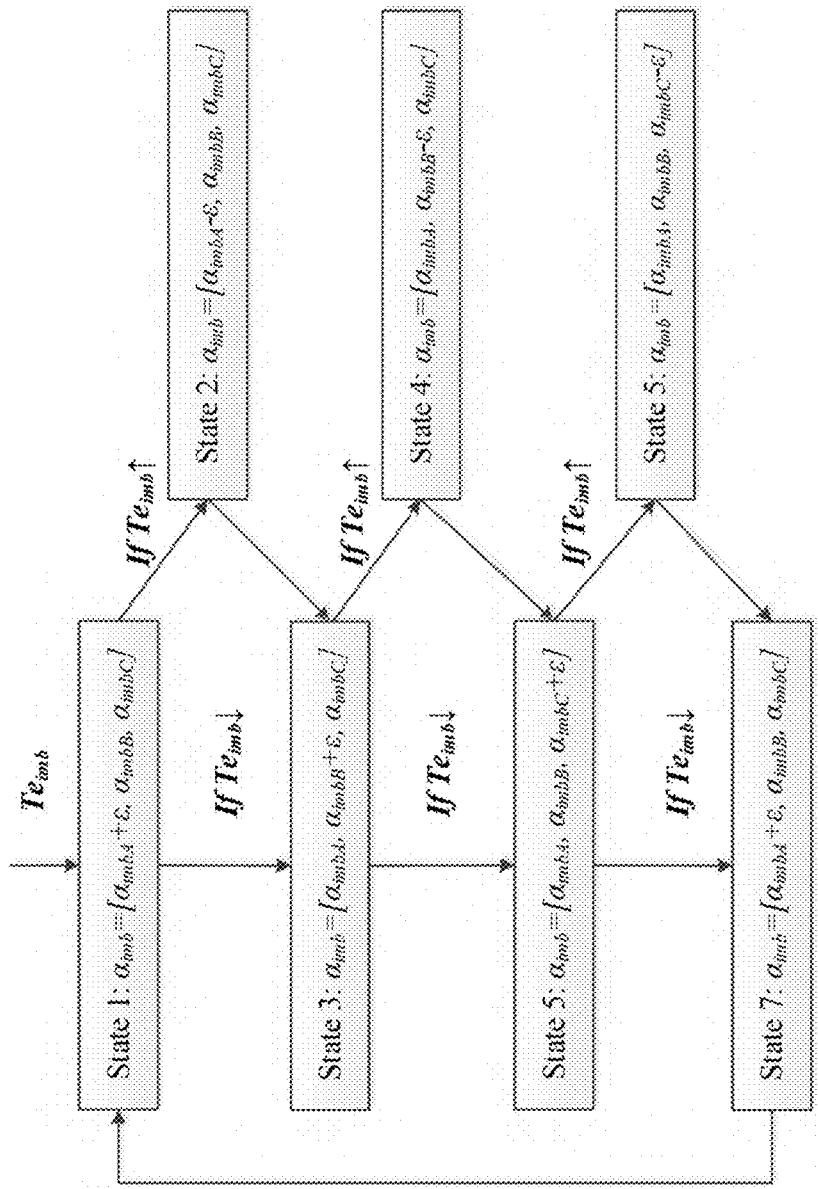
FIG. 8 is a state diagram depicting an illustrative state machine for a three-phase SRM in accordance with aspects of the present disclosure.

An illustration of the state machine for a three-phase SRM is shown in FIG. 8. The 3-phase electromechanical imbalance factors $\alpha_{imb} = [\alpha_{imbA} \ \alpha_{imbB} \ \alpha_{imbC}]$ are generated by an iterative process by evaluating the changes of the imbalance torque content $Te_{imb}$.

With continuing reference to FIG. 8, in State 1 a vector of imbalance factor $\alpha_{imb} = [\alpha_{imbA} + \varepsilon \ \alpha_{imbB} \ \alpha_{imb}]$ is initially applied, where $\varepsilon$ is a small number to represent an incremental change. Then the imbalance torque content $Te_{imb}$ is evaluated. If $Te_{imb}$ increases, the algorithm runs into State 2, otherwise it skips State 2 and runs into State 3 directly. In the end the state machine will move to State 7, which is effectively back to State 1, and repeat the loop again. Through this iterative process, a vector of imbalance factor that minimizes the imbalance torque will be generated.

Referring back to FIG. 1, the torque estimator module 118 receives the harmonic current command $I_h^*$, estimated base current $I_0$, and the phase advancement angle $\theta_{adv}$ as inputs, and the estimated average torque $T_{e0\_est}$ is calculated as output. Machine parameters measured at various load conditions are used to derive the system matrices in the calculation of the estimated average torque. Depending upon the nature of the machine parameters, these parameters can be measured prior to implementing system 100 for a specific combination of SRM 104 and load, can be estimated for a particular class of SRM 104 for which controller 102 is specifically designed, or can be measured in real time, possibly with suitable sensor equipment. The estimated average torque $T_{e0\_est}$ is compared with the average torque command $T_{e0}^*$ from the user of system 100 in PI controller 120 to obtain the base current command $I_0^*$. A speed control loop can be added if a speed command is required. The speed feedback can be calculated by the time derivative of the rotor position feedback Br.

PI controller 120 may include any suitable proportional-integral, closed-loop controller configured to perform the functions described below. PI controller 120 takes at least two coefficients: the proportional coefficient, which governs the degree to which PI controller 120 acts upon the difference (i.e., the control error) between the estimated average torque $T_{e0\_est}$ and the average torque command $T_{e0}^*$ in modifying the base current command $I_0^*$ so that the estimated average torque $T_{e0\_est}$ is brought approximately equal to the average torque command $T_{e0}^*$, and the integral coefficient, which accounts for historically accumulating control error by increasing the correction to the base current command $I_0^*$ in proportion to greater control errors that last longer. Thus, a greater P coefficient results in a more dramatic correction to a measured difference between the user command and actual average torque output by SRM 104, and a greater I coefficient results in a faster correction when each iteration of PI controller 120 results in a continuing control error. If I is too high, PI controller 120 may overshoot and oscillate around the average torque command $T_{e0}^*$ point. Depending on applications, PI controller 120 can be implemented as a proportional-integral-derivative (PID) loop, with the D coefficient acting as a clamping factor to increase the control loop stability. It will be appreciated by a person skilled in the relevant art that PI controller 120 provides the base function of controller 102 to enable it to bring SRM 104 to a user-commanded torque and keep SRM 104 at that commanded torque despite transient changes in load. Because it receives an average torque command and an average torque estimate, PI controller 120, however, does not in itself provide any significant mitigation or manipulation of torque-induced harmonics.

In current synthesizer 122 module, the harmonic current command $I_h^*$, base current command $I_0^*$, and rotor position $\theta_r$ are received as inputs, and the phase current command $I_{ph}^*$ is generated as output. The phase excitation window defines the beginning and ending moments for each phase excitation. They are by default determined by the number of phases, and evenly phase-shifted for each phase. The harmonic current command $I_h^*$ represents a set of even and odd harmonic component magnitudes. These harmonic components are multiplied by the associated cosine and sine values of the rotor position $\theta_r$ with different orders, and then summed with the base current command $I_0^*$ to generate a combined phase current waveform. Such combined phase current waveform is further used to form the individual phase current command $I_{ph}^*$ for each phase by multiplying it with the phase excitation windows. The phase current command $I_{ph}^*$ for each phase is further multiplied with the electromechanical imbalance factor $\alpha_{imb}$ to obtain the phase current command with correction $I_{ph}^{**}$.

In current/voltage drive module 124, the phase current $I_{ph}$ is regulated according to the command $I_{ph}^{**}$, with the phase advancement angle $\theta_{adv}$ to activate each phase before its excitation window starts. Current and voltage control techniques (e.g., delta hysteresis, PWM control) can be used to generate switching signals to the power electronic switches (e.g., MOSFETs and IGBTs). Particularly, in high power, high pole count, and high speed applications, due to the large phase voltage of the SRM, the rates of current changes at switch on and off period can be greatly different. Therefore, an asymmetric hysteresis current control is implemented to improve current tracking, in which the turn-on and turn-off bandwidths are different so to put more restriction on the faster changing current direction. By doing so, the current overshoot can be reduced and the tracking of current command can be improved.

With traditional hysteresis control, current is regulated within an evenly distributed positive and negative band width (e.g., +/−h). For example, when the current is higher than the commanded value by +h, then the switch will turn off so that the current will drop. Conversely, when current is lower than the commanded value by −h, then the switch will turn on so that the current will increase. The main goal in that situation is to regulate the current around the commanded value within a bandwidth, as closely as possible.

When the current increases or decreases during regulation, there is a rate of current change, and the "direction" referred to herein refers to whether the current is increasing or decreasing. The current change rate is sometimes faster in one direction, e.g., depending on the mode of operation and machine characteristics.

In high power, high pole count, and high speed applications, the difference in current change rate in the two directions becomes more significant. Therefore, in practical applications, due to sensing and computing delay of the hardware, traditional hysteresis current control introduces overshoot or undershoot in current tracking. For instance, when the rate of current change is faster as it increases, and the current meets the upper boundary (i.e., +h), the switch turns off with a delay so that the current will actually overshoot and exceed the upper boundary. A similar situation exists in the decreasing direction.

Accordingly, by implementing asymmetric hysteresis current control, such a delay in firing the switching on or off is compensated by applying a more restricted band width (i.e., smaller h value) to a faster changing current direction (increase or decrease). Hence the asymmetric hysteresis current control can improve current tracking when there are hardware constraints (including sensing and computing power limits), especially in high power, high pole count, and high speed applications.

Figure 3:
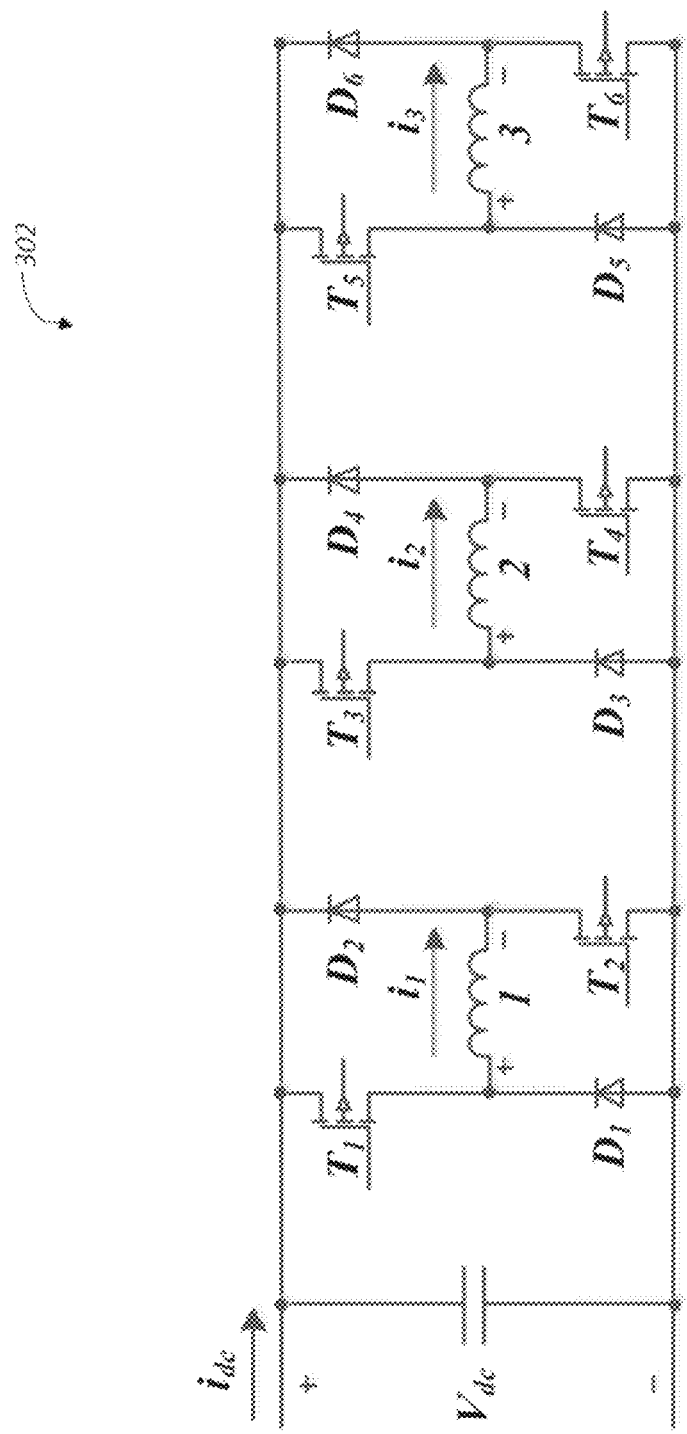
FIG. 3 is a schematic diagram of an illustrative inverter topology of a current/voltage drive of the controller of FIG. 1.

FIG. 3 depicts the topology of an illustrative inverter portion 302 of current/voltage drive module 124. Inverter 302 is constructed with an asymmetric H-bridge module for each phase. Although inverter 302 is depicted with three phases, this topology is applicable to an arbitrary number of phases. To reduce switching losses, a soft switching technique can be applied. Soft switching is a method that keeps one leg (top or bottom) of inverter 302 always closed and applies switching events to the other leg during the phase excitation window. The various switching gates T1 through T6 are controlled by portions of current/voltage drive module 124 in response to the current rotor 106 angle and phase currents, to ensure the correct phase of stator windings is energized at the correct time to keep SRM 104 moving properly as commanded.

Figure 4:
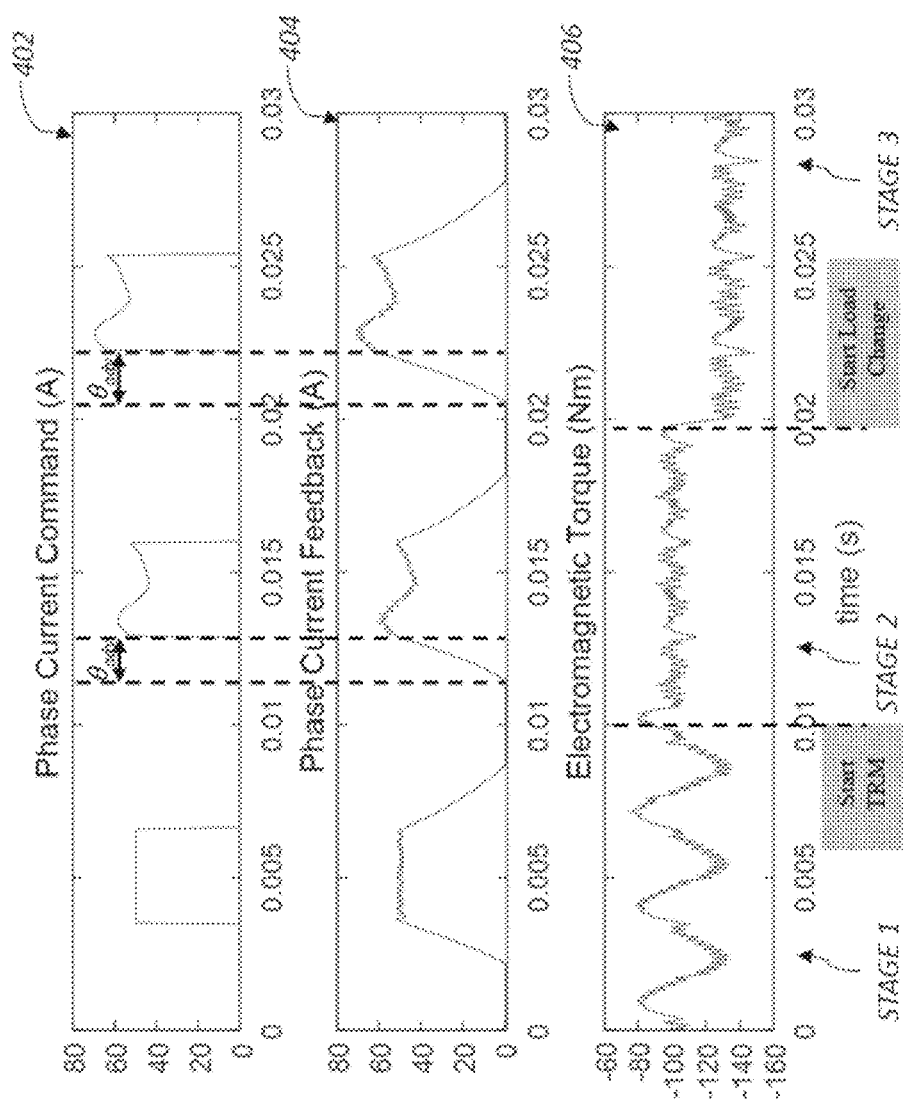
FIG. 4 depicts changes in current command, current feedback, and electromagnetic torque, when disclosed methods for vibration and noise manipulation for an SRM are implemented, and when a load change is incurred.

FIG. 4 depicts a plurality of simulation waveforms of SRM drive system 100 using a commercially available 3-phase 12/8 configuration SRM. A first waveform 402, captioned "Phase Current Command," illustrates the phase current command $I_{ph}^*$ for one phase. The phase current command $I_{ph}^*$ is a combination of base current $I_0^*$ and harmonic currents $I_h^*$ that are commanded to mitigate torque ripple. A second waveform 404, captioned "Phase Current Feedback," illustrates the phase current measurement $I_{ph}$ from the SRM stator phase coil. A third waveform 406, captioned "Electromagnetic Torque," illustrates the electromagnetic torque generated by the SRM. There are three stages being studied in FIG. 4, each of which is labeled accordingly. The first stage is traditional operation without torque ripple mitigation (TRM). The second stage is to enable the TRM control algorithm to mitigate the third and the sixth order torque ripple harmonics. The third stage is to start a load change from −100 Nm to −130 Nm, with TRM enabled.

With continuing reference to FIG. 4, from the first stage to the second stage, as TRM is enabled, the torque ripples are reduced significantly and rapidly by using the adaptive gradient method described herein. The phase advancement angle $\theta_{adv}$ is calculated in real-time and added prior to the excitation window of each phase so that the actual phase current is activated in advance to contain critical harmonic content and achieve optimal torque ripple mitigation result. From the second stage to the third stage, during the load condition change, the adaptive gradient method shows great responsiveness and robustness to track the torque command while performing TRM. The phase advancement angle $\theta_{adv}$ increases automatically according to the load change.

Figure 5:
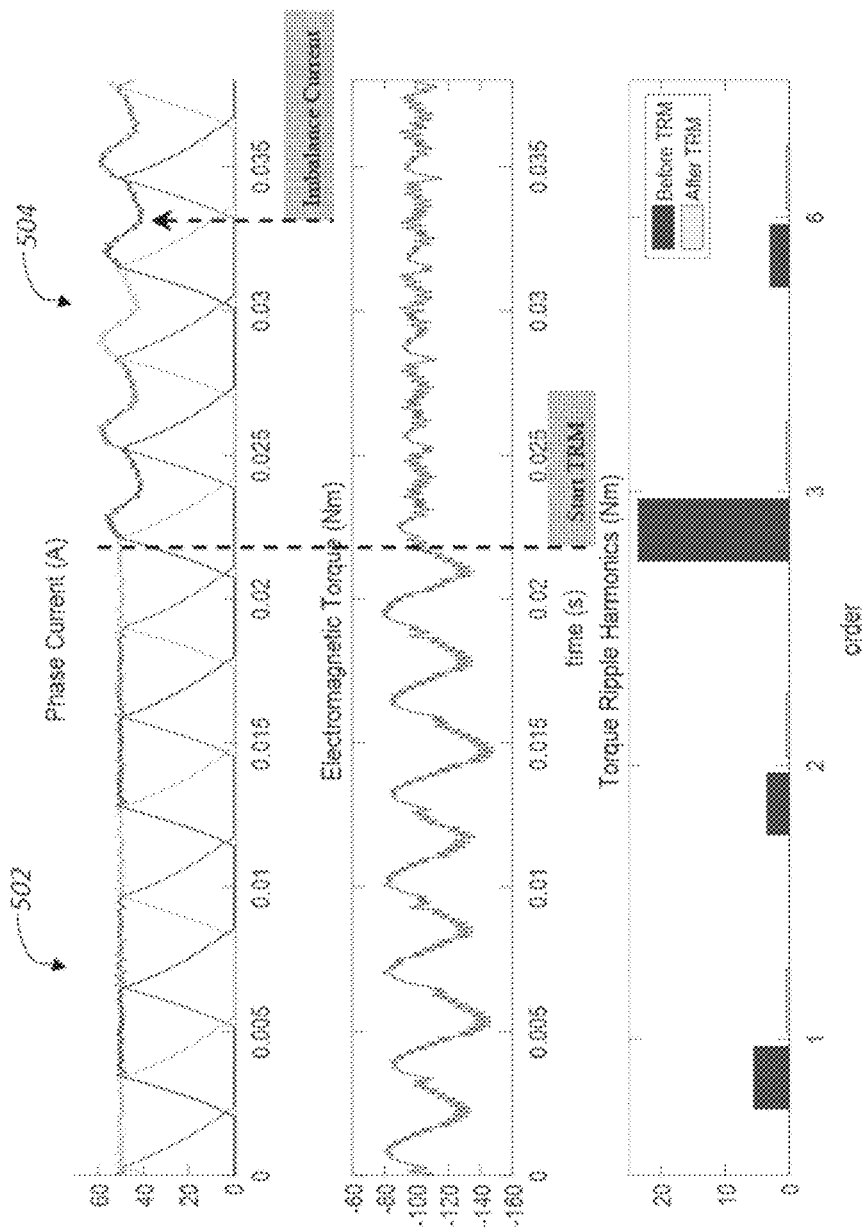
FIG. 5 depicts changes to phase current, electromagnetic torque, and torque ripple harmonics when disclosed methods for vibration and noise manipulation for an SRM are implemented, including imbalance correction.

FIG. 5 depicts the waveforms of three-phase current feedback, electromagnetic torque, and torque ripple harmonic spectrum analysis of the torque waveform. The purpose of this figure is to illustrate the importance and effectiveness of applying electromechanical imbalance correction along with the TRM control algorithm. For a given SRM 104, torque harmonic orders start with the number of phases, e.g., a three-phase SRM will have third order harmonics relative to a single rotation of rotor 106. An imbalance in rotor 106 will be typically experienced as a first order vibration. However, torque-induced harmonics in a three-phase SRM 104 will be experienced as three cycles per revolution of rotor 106, each pulse corresponding to one phase, thereby creating 3rd order harmonics relative to the rotation of rotor 106. Three phase SRMs also typically have additional higher order harmonics, based on multiples of three (e.g. sixth, twelfth order). Likewise, a machine with four phases would experience initial torque harmonics as fourth order relative to each rotation of rotor 106. In contrast, imbalances can be experienced as first order harmonics, which may necessitate correction to only one or two phases of the stator windings, and then only when rotor 106 is at specific angular positions.

There are two stages shown in FIG. 5. In a first stage 502, the SRM is operating without TRM. Three phase balanced current is applied to the SRM. However, electromechanical imbalance is present in this case so that there is significant first and second order (lower than the phase number of the SRM) torque ripple harmonics in the system. In a second stage 504, the TRM control algorithm is enabled along with electromechanical imbalance correction. Rather than applying a balanced set of three-phase current, imbalance current in one of the phases is applied to compensate the electromechanical imbalance in torque ripples. As a result, not only are the third and the sixth order torque ripple harmonics mitigated by injecting current harmonics, but also the first and the second order torque ripple harmonics are minimized by using electromechanical imbalance correction.

Figure 6:
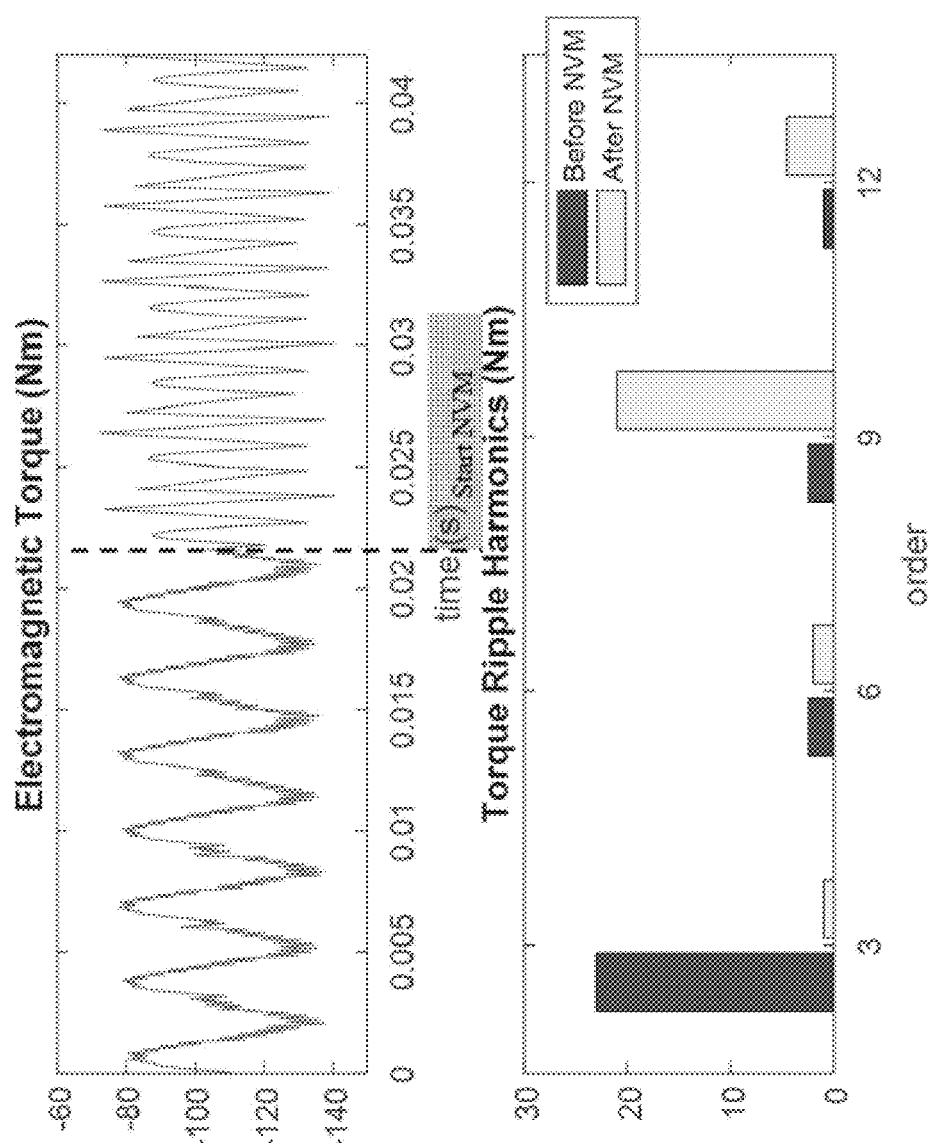
FIG. 6 depicts changes to electromagnetic torque and torque ripple harmonics when disclosed methods for vibration and noise manipulation for an SRM are implemented, with the target being manipulation of specific harmonics.

FIG. 6 depicts a waveform of electromagnetic torque (top) and its harmonic spectrum analysis (bottom). This figure is intended to illustrate how the disclosed systems and methods can be used to manipulate the harmonic spectrum of SRM 104, rather than reducing or mitigating torque and imbalance noise and vibrations. The noise and vibration manipulation (NVM) starts near the center of the chart, as indicated in FIG. 6. Instead of torque ripple mitigation, the objective of NVM is harmonic spectrum shaping. Therefore, in the torque waveform, the low frequency torque ripples are changed to higher frequency ripples after the NVM is enabled. From the harmonic spectrum analysis, it shows the distribution of the third, sixth, ninth, and twelfth order harmonics before (left) and after (right) NVM is enabled. As depicted, there are mostly third order harmonics in the torque ripples before NVM, while there are mostly ninth and twelfth order harmonics after NVM. The noise and vibration profile of the drive has been changed and, with specific tunings of adaptive gradient method module 204, the noise and vibration profile of SRM 104 can be tailored to virtually any desired effect.

B. Illustrative Method for SRM Vibration and Noise Manipulation

Figure 7:
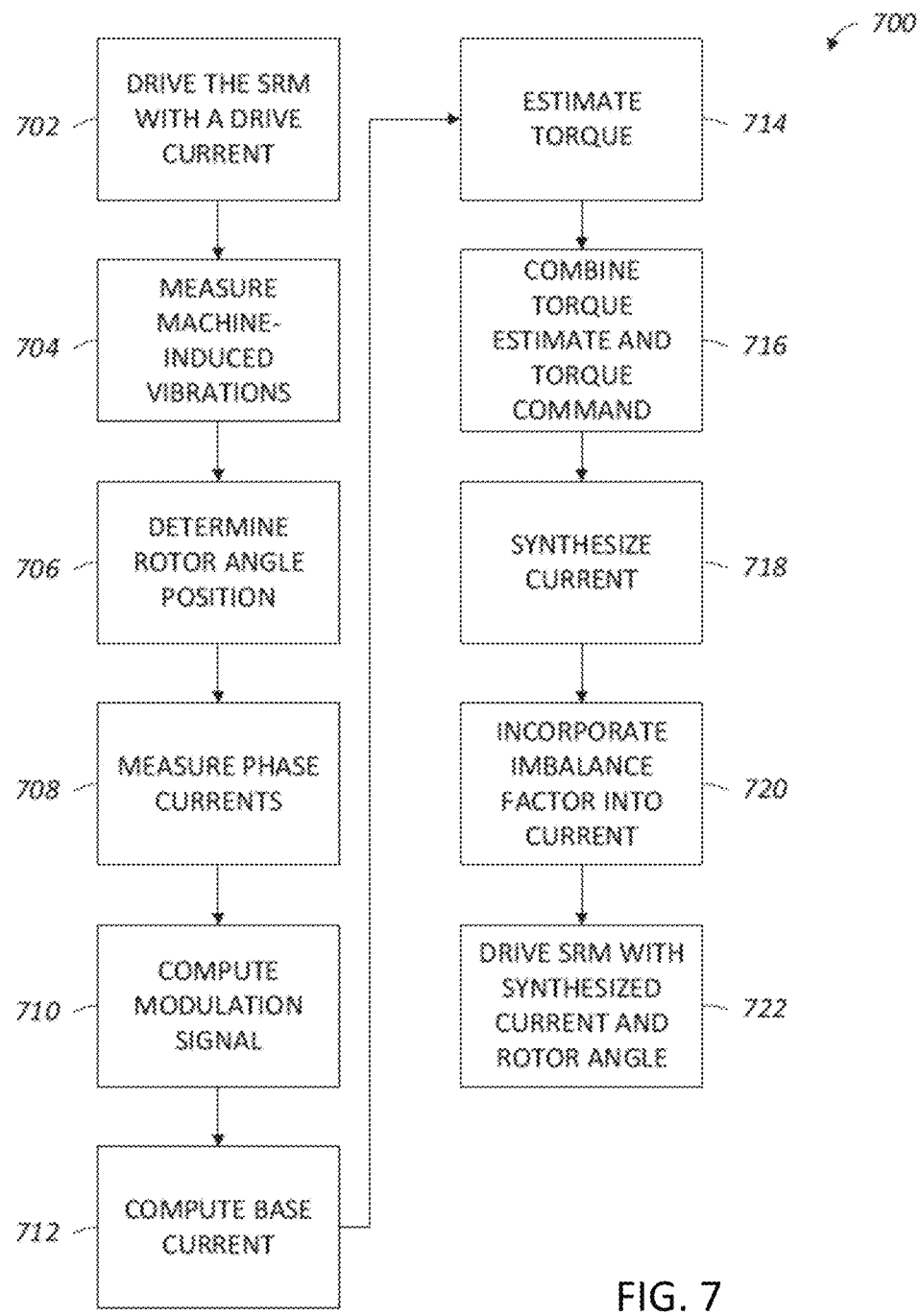
FIG. 7 is a flowchart depicting steps of an illustrative method for vibration and noise manipulation for a switched reluctance machine in accordance with aspects of the present disclosure.

This section describes steps of an illustrative method 700 for manipulating the vibration and/or noise of a switched reluctance machine; see FIG. 7. Aspects of system 100, e.g., controller 102, may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 700 are described below and depicted in FIG. 7, the steps need not necessarily all be performed, and in some cases may be performed simultaneously or in a different order than the order shown.

Step 702 of method 700 includes driving SRM 104 with a drive current synthesized from a user-commanded torque level. Step 704 includes measuring torque-induced vibrations.

Step 706 includes determining the rotor angle position, and stator phase currents are measured in step 708. Step 710 includes feeding these inputs into a controller (e.g., controller 102), and computing a modulation signal. In step 710, a real-time optimization module may be used. This includes selecting particular optimization objectives, as described above with reference to real-time optimization module 116. In some examples, real-time optimization module 116 is capable of integrating multiple objectives to strike a balance of desired outcomes, e.g., computing a modulation signal that is intended to mitigate torque-induced vibrations as well as optimize efficiency. Where multiple objectives are pursued, it should be understood that the resulting modulation signal will typically result in operation of SRM 104 that is something of a compromise, with torque-induced vibrations not being mitigated to their fullest extent and efficiency not being maximized, but rather a best balance between the two objectives. Likewise, more than two objectives can be sought, with the resulting signal an attempted balance between all intended objectives.

Step 712 includes determining a base current and step 714 includes estimating the actual torque being output by SRM 104. This estimate is combined with the user-commanded torque in step 716, and an initial drive current is synthesized in step 718.

Step 720 includes incorporating this drive current with a measured machine imbalance factor (i.e., the electromechanical imbalance factor). The drive current to SRM 104, provided in step 702, is resynthesized in step 722 to include the rotor's angular position such that the appropriate stator windings are energized. This step facilitates the incorporation of correction for low-order harmonics created by machine imbalances.

A person skilled in the relevant art will understand method 700 as being iterative, inasmuch as the controller acts as a closed-loop controller while SRM 104 is in operation. Controller 102 is continually monitoring vibrations, angular positions, and phase currents, and is continually computing corrective factors as long as SRM 104 is in operation.

Method 700 provides several advantages over known systems. These include the use of a real-time optimization module for manipulation (and not just mitigation) of various and selected harmonics; the incorporation of correction for low-order harmonics created by machine imbalances; and the use of vibration sensors at locations other than on the SRM itself to reduce and/or manipulate vibrations further down the drive line from the SRM. With reference to this last point, in some situations it may be desirable to reduce vibrations experienced by the load itself, rather than the SRM. Accordingly, vibrations may be measured with respect to the load. Manipulation/mitigation of load vibrations may, in some circumstances, result in an increase in noise and/or vibration in the SRM. However, this process may thereby achieve a desired reduction or manipulation of vibrations in the load.

C. Illustrative Combinations and Additional Examples

This section describes additional aspects and features of controllers for SRMs as well as related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method for mitigation of torque-induced vibration and noise in a switched reluctance machine with arbitrary stator and rotor configuration, comprising: driving the switched reluctance machine with a drive current supplied from a closed-loop controller; disposing a vibration sensor relative to the SRM drivetrain so that the vibration sensor can measure torque-induced vibrations from the SRM drivetrain in at least one axis; measuring the torque-induced vibrations with the vibration sensor; determining the corresponding angular position of the rotor; wherein angular position of the rotor may be determined using any suitable device (e.g., an encoder, resolver, Hall-effect sensors) that can accurately detect the angular position of the rotor, or by sensorless techniques based on the feedback of the phase current (as detected by current measurement devices and voltage measurements $I_{ph}$ and $V_{ph}$, respectively, with appropriate calculations performed); calculating by a real-time optimization module a current command configured to modify the torque-induced vibrations from the input measured torque-induced vibrations and rotor angular position; wherein the real-time optimization module includes processing logic configured to determine a base current estimation, a phase advancement angle, and an electromechanical imbalance factor, and to execute an adaptive gradient and cost function module to generate a current command; wherein a modulation signal is generated by comparing the current command to the measured current in the current/voltage drive, allowing an asymmetric hysteresis current control.

A1. The method of A0, wherein the current command is generated by the current synthesizer module that forms the combined phase current command with base current command, harmonic current command, and electromechanical imbalance factor.

A2. The method of A0, wherein the adaptive gradient method analysis includes an auto-tuning step size and one or more cost function constraints based on user-defined objectives including torque ripple mitigation, harmonic spectrum shaping, and/or efficiency improvement.

A3. The method of A2, wherein the auto-tuning step size for the adaptive gradient method is determined by feeding the magnitude of the torque harmonic into a PI-based equation with feedback.

A4. The method of A2, wherein the cost function constraints include an offset to torque harmonic command and a limit to the RMS value of the current harmonics.

A5. The method of A0, wherein a leaky integrator is used for extracting information relating to the torque harmonic information from the measured torque-induced vibrations. The leaky integrator is used for the extraction of scalar components related to the even and odd components of the vibration harmonics of interests. Using a leaky integrator allows a computationally-efficient means of determining torque ripple-related values with reduced sensitivity to noise outside of the frequencies of interest.

A6. The method of A0, wherein the electromechanical imbalance factor is computed from the base current and the torque harmonic information and applied to the current command.

A7. The method of A0, wherein the phase advancement angle is determined from the torque harmonics information and phase current feedback.

A8. The method of A0, wherein incorporating the modulation signal into the drive current further comprises incorporating the phase advancement angle and implementing an asymmetric hysteresis current control that allows unequal upper and lower bandwidths.

B0. A system for controlling a switched reluctance machine drivetrain to modify machine vibrations, comprising: a switched reluctance machine drivetrain including a switched reluctance machine (SRM) having a load mechanically coupled to a rotor; a controller configured to drive the SRM using a drive signal, the controller further comprising: a real-time optimization module; a torque estimator module; and a current synthesizer module; a vibration sensor configured and disposed to detect torque-induced vibrations from the SRM drivetrain; and an angular position sensor configured to detect the angular position of the rotor; wherein the real-time optimization module further comprises a harmonic extraction module, a base current estimator, a phase advancement angle module, an electromechanical imbalance factor module, and an adaptive gradient and cost function module; wherein the real-time optimization module is configured to receive inputs from the vibration sensor and angular position sensor, the harmonic extraction module is configured to determine torque harmonic information from the torque-induced vibrations detected by the vibration sensor, and the adaptive gradient and cost function module calculates a modulation signal to modify the torque-induced vibrations; and wherein the controller is configured to incorporate the modulation signal into the drive signal using an asymmetric hysteresis current control.

B1. The system of B0, wherein the inverter implements asymmetric hysteresis current control that allows unequal upper and lower bandwidths.

C0. A controller for a switched reluctance machine, comprising: a torque command input; a current sensor configured to measure the phase currents across the switched reluctance machine (SRM); one or more vibration sensors configured to measure torque-induced vibrations from the SRM drivetrain; an angular sensor configured to detect the angular position of a rotor of the switched reluctance machine; a real-time optimization module, further comprising: a harmonic extraction module using leaky integration method, a base current estimator, a phase advancement angle module, an electromechanical imbalance factor module, and an adaptive gradient and cost function module; a torque estimator module; a current synthesizer module; and a current/voltage drive inverter; wherein the adaptive gradient and cost function module calculates a modulation signal from the vibration sensor and angular sensor signals to reduce the measured torque-induced vibrations using an adaptive gradient method analysis.

C1. The controller of C0, wherein the harmonic extraction module determines torque harmonic information from the measured torque-induced vibrations.

C2. The controller of C0, wherein the electromechanical imbalance factor receives a base current from the base current estimator module, and computes an electromechanical imbalance factor from the base current and torque harmonic information.

C3. The controller of C0, wherein the current/voltage drive inverter is configured using an asymmetric H-bridge topology, and implements asymmetric hysteresis current control.

D0. A method for mitigation of machine-induced vibration and noise in a switched reluctance machine drivetrain, the method comprising: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; determining an angular position of the rotor using an angular position sensor; receiving phase current feedback from a current measurement device coupled to stator windings of the SRM; extracting torque harmonic information from the measured machine-induced vibrations, based on the angular position of the rotor; estimating a base current, based on the phase current feedback and the angular position of the rotor; calculating an electromechanical imbalance factor from the base current and the torque harmonic information; and automatically modifying the machine-induced vibrations by incorporating, using the controller, the electromechanical imbalance factor into the drive current.

D1. The method of D0, further comprising: determining a harmonic current command by performing a gradient descent analysis to minimize a cost function, wherein the cost function is based on the torque harmonic information; and incorporating, using the controller, the harmonic current command into the drive current.

D2. The method of D1, wherein performing the gradient descent analysis to minimize the cost function comprises minimizing torque ripple.

D3. The method of D1, wherein performing the gradient descent analysis to minimize the cost function comprises biasing the SRM toward a desired torque harmonic profile.

D4. The method of D1, wherein performing the gradient descent analysis to minimize the cost function comprises limiting the harmonic current command to be less than a maximum allowable root-mean-squared value.

D5. The method of any one of paragraphs D1 through D4, further comprising automatically reducing a step size of the gradient descent analysis as torque ripple harmonics are reduced.

D6. The method of any one of paragraphs D0 through D5, further comprising: determining a phase advancement angle from the torque harmonic information and the phase current feedback; and driving the SRM using the drive current and the phase advancement angle.

D7. The method of any one of paragraphs D0 through D6, further comprising: controlling the drive current using asymmetric hysteresis current control, wherein a turn-on bandwidth and a turn-off bandwidth are automatically controlled such that a greater restriction is imposed on a faster-changing current direction.

D8. The method of D0, further comprising: determining a harmonic current command by performing a gradient descent analysis to minimize a cost function, wherein the cost function is based on the torque harmonic information; incorporating, using the controller, the harmonic current command into the drive current; determining a phase advancement angle from the torque harmonic information and the phase current feedback; and driving the SRM using the drive current and the phase advancement angle.

E0. A method for mitigation of machine-induced vibration and noise in a switched reluctance machine drivetrain, the method comprising: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; receiving phase current feedback from a current measurement device coupled to stator windings of the SRM; receiving phase voltage feedback from a voltage measurement device coupled to the stator windings of the SRM; calculating an angular position of the rotor based on the phase current feedback and phase voltage feedback; extracting torque harmonic information from the measured machine-induced vibrations, based on the angular position of the rotor; estimating a base current, based on the phase current feedback and the angular position of the rotor; calculating an electromechanical imbalance factor from the base current and the torque harmonic information; and automatically modifying the machine-induced vibrations by incorporating, using the controller, the electromechanical imbalance factor into the drive current.

E1. The method of E0, further comprising: determining a harmonic current command by performing an gradient descent analysis to minimize a cost function, wherein the cost function is based on the torque harmonic information; and incorporating, using the controller, the harmonic current command into the drive current.

E2. The method of E1, wherein performing the gradient descent analysis to minimize the cost function comprises a control objective of minimizing torque ripple.

E3. The method of E1, wherein performing the gradient descent analysis to minimize the cost function comprises a control objective of biasing the SRM toward a desired torque harmonic profile.

E4. The method of E1, wherein performing the gradient descent analysis to minimize the cost function comprises limiting the harmonic current command to be less than a selected maximum.

E5. The method of any one of paragraphs E1 through E4, further comprising automatically reducing a step size of the gradient descent analysis as torque ripple harmonics are reduced.

E6. The method of any one of paragraphs E0 through E5, further comprising: determining a phase advancement angle from the torque harmonic information and the phase current feedback; and driving the SRM using the drive current and the phase advancement angle.

E7. The method of any one of paragraphs E0 through E, further comprising: controlling the drive current using asymmetric hysteresis current control, wherein a turn-on bandwidth and a turn-off bandwidth are automatically controlled such that a greater restriction is imposed on a faster-changing current direction.

E8. The method of E0, further comprising: determining a harmonic current command by performing a gradient descent analysis to minimize a cost function, wherein the cost function is based on the torque harmonic information; incorporating, using the controller, the harmonic current command into the drive current; determining a phase advancement angle from the torque harmonic information and the phase current feedback; and driving the SRM using the drive current and the phase advancement angle.

F0. A method for mitigation of machine-induced vibration and noise in a switched reluctance machine drivetrain, the method comprising: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; determining an angular position of the rotor using an angular position sensor; receiving phase current feedback from a current measurement device coupled to stator windings of the SRM; extracting torque harmonic information from the measured machine-induced vibrations, based on the angular position of the rotor; estimating a base current, based on the phase current feedback and the angular position of the rotor; determining a harmonic current command by performing a gradient descent analysis to minimize a cost function, wherein the cost function is based on the torque harmonic information; and automatically modifying the machine-induced vibrations by incorporating, using the controller, the harmonic current command into the drive current.

F1. The method of F0, further comprising: calculating an electromechanical imbalance factor from the base current and the torque harmonic information; and incorporating, using the controller, the electromechanical imbalance factor into the drive current.

F2. The method of any one of paragraphs F0 through F1, wherein performing the gradient descent analysis to minimize the cost function comprises a control objective of minimizing torque ripple.

F3. The method of any one of paragraphs F0 through F2, wherein performing the gradient descent analysis to minimize the cost function comprises a control objective of biasing the SRM toward a desired torque harmonic profile.

F4. The method of any one of paragraphs F0 through F3, wherein performing the gradient descent analysis to minimize the cost function comprises limiting the harmonic current command to be less than a maximum allowable root-mean-squared value.

F5. The method of any one of paragraphs F0 through F4, further comprising automatically reducing a step size of the gradient descent analysis as torque ripple harmonics are reduced.

F6. The method of any one of paragraphs F0 through F5, further comprising: determining a phase advancement angle from the torque harmonic information and the phase current feedback; and driving the SRM using the drive current and the phase advancement angle.

F7. The method of any one of paragraphs F0 through F6, further comprising: controlling the drive current using asymmetric hysteresis current control, wherein a turn-on bandwidth and a turn-off bandwidth are automatically controlled such that a greater restriction is imposed on a faster-changing current direction.

F8. The method of F0, further comprising: calculating an electromechanical imbalance factor from the base current and the torque harmonic information; incorporating, using the controller, the electromechanical imbalance factor into the drive current; determining a phase advancement angle from the torque harmonic information and the phase current feedback; and driving the SRM using the drive current and the phase advancement angle.

G0. A method for mitigation of machine-induced vibration and noise in a switched reluctance machine drivetrain, the method comprising: driving a switched reluctance machine (SRM) using a drive current supplied from a closed-loop controller, the SRM having an SRM drivetrain including a load mechanically coupled to a rotor of the SRM; measuring machine-induced vibrations from the SRM drivetrain on at least one axis, using a vibration sensor; receiving phase current feedback from a current measurement device coupled to stator windings of the SRM; receiving phase voltage feedback from a voltage measurement device coupled to the stator windings of the SRM; calculating an angular position of the rotor based on the phase current feedback and phase voltage feedback; extracting torque harmonic information from the measured machine-induced vibrations, based on the angular position of the rotor; estimating a base current, based on the phase current feedback and the angular position of the rotor; determining a harmonic current command by performing an gradient descent analysis to minimize a cost function, wherein the cost function is based on the torque harmonic information; and automatically modifying the machine-induced vibrations by incorporating, using the controller, the harmonic current command into the drive current.

G1. The method of G0, further comprising: calculating an electromechanical imbalance factor from the base current and the torque harmonic information; and incorporating, using the controller, the electromechanical imbalance factor into the drive current.

G2. The method of any one of paragraphs G0 through G1, wherein performing the gradient descent analysis to minimize the cost function comprises a control objective of minimizing torque ripple.

G3. The method of any one of paragraphs G0 through G2, wherein performing the gradient descent analysis to minimize the cost function comprises a control objective of biasing the SRM toward a desired torque harmonic profile.

G4. The method of any one of paragraphs G0 through G3, wherein performing the gradient descent analysis to minimize the cost function comprises limiting the harmonic current command to be less than a selected maximum.

G5. The method of any one of paragraphs G0 through G4, further comprising automatically reducing a step size of the gradient descent analysis as torque ripple harmonics are reduced.

G6. The method of any one of paragraphs G0 through G5, further comprising: determining a phase advancement angle from the torque harmonic information and the phase current feedback; and driving the SRM using the drive current and the phase advancement angle.

G7. The method of any one of paragraphs G0 through G6, further comprising: controlling the drive current using asymmetric hysteresis current control, wherein a turn-on bandwidth and a turn-off bandwidth are automatically controlled such that a greater restriction is imposed on a faster-changing current direction.

G8. The method of G0, further comprising: calculating an electromechanical imbalance factor from the base current and the torque harmonic information; incorporating, using the controller, the electromechanical imbalance factor into the drive current; determining a phase advancement angle from the torque harmonic information and the phase current feedback; and driving the SRM using the drive current and the phase advancement angle.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for mitigation of machine-induced vibration and noise in a switched reluctance machine drivetrain, the method comprising:
   driving a switched reluctance machine (SRM) using a drive current supplied from a closed-loop controller, the SRM having an SRM drivetrain including a load mechanically coupled to a rotor of the SRM;
   measuring machine-induced vibrations from the SRM drivetrain on at least one axis, using a vibration sensor;
   determining an angular position of the rotor using an angular position sensor;
   receiving phase current feedback from a current measurement device coupled to stator windings of the SRM;
   extracting torque harmonic information from the measured machine-induced vibrations, based on the angular position of the rotor;
   estimating a base current, based on the phase current feedback and the angular position of the rotor;
   calculating an electromechanical imbalance factor from the base current and the torque harmonic information; and
   automatically modifying the machine-induced vibrations by incorporating, using the controller, the electromechanical imbalance factor into the drive current.

2. The method of claim 1, further comprising:
   determining a harmonic current command by performing a gradient descent analysis to minimize a cost function, wherein the cost function is based on the torque harmonic information; and
   incorporating, using the controller, the harmonic current command into the drive current.

3. The method of claim 2, wherein performing the gradient descent analysis to minimize the cost function comprises a control objective selected from the group consisting of (a) minimizing torque ripple and (b) biasing the SRM toward a desired torque harmonic profile.

4. The method of claim 2, wherein performing the gradient descent analysis to minimize the cost function comprises limiting the harmonic current command to be less than a maximum allowable root-mean-squared value.

5. The method of claim 2, further comprising automatically reducing a step size of the gradient descent analysis as torque ripple harmonics are reduced.

6. The method of claim 1, further comprising:
   determining a phase advancement angle from the torque harmonic information and the phase current feedback; and
   driving the SRM using the drive current and the phase advancement angle.

7. The method of claim 1, further comprising:
   controlling the drive current using asymmetric hysteresis current control, wherein a turn-on bandwidth and a turn-off bandwidth are automatically controlled such that a greater restriction is imposed on a faster-changing current direction.

8. A method for mitigation of machine-induced vibration and noise in a switched reluctance machine drivetrain, the method comprising:
   driving a switched reluctance machine (SRM) using a drive current supplied from a closed-loop controller, the SRM having an SRM drivetrain including a load mechanically coupled to a rotor of the SRM;
   measuring machine-induced vibrations from the SRM drivetrain on at least one axis, using a vibration sensor;
   receiving phase current feedback from a current measurement device coupled to stator windings of the SRM;
   receiving phase voltage feedback from a voltage measurement device coupled to the stator windings of the SRM;
   calculating an angular position of the rotor based on the phase current feedback and phase voltage feedback;
   extracting torque harmonic information from the measured machine-induced vibrations, based on the angular position of the rotor;
   estimating a base current, based on the phase current feedback and the angular position of the rotor;

calculating an electromechanical imbalance factor from the base current and the torque harmonic information; and automatically modifying the machine-induced vibrations by incorporating, using the controller, the electromechanical imbalance factor into the drive current.

9. The method of claim 8, further comprising:

determining a harmonic current command by performing an gradient descent analysis to minimize a cost function, wherein the cost function is based on the torque harmonic information; and incorporating, using the controller, the harmonic current command into the drive current.

10. The method of claim 9, wherein performing the gradient descent analysis to minimize the cost function comprises a control objective selected from the group consisting of (a) minimizing torque ripple and (b) biasing the SRM toward a desired torque harmonic profile.

11. The method of claim 9, wherein performing the gradient descent analysis to minimize the cost function comprises limiting the harmonic current command to be less than a selected maximum.

12. The method of claim 9, further comprising automatically reducing a step size of the gradient descent analysis as torque ripple harmonics are reduced.

13. The method of claim 8, further comprising:

determining a phase advancement angle from the torque harmonic information and the phase current feedback; and driving the SRM using the drive current and the phase advancement angle.

14. The method of claim 8, further comprising:

controlling the drive current using asymmetric hysteresis current control, wherein a turn-on bandwidth and a turn-off bandwidth are automatically controlled such that a greater restriction is imposed on a faster-changing current direction.

15. A method for mitigation of machine-induced vibration and noise in a switched reluctance machine drivetrain, the method comprising:

driving a switched reluctance machine (SRM) using a drive current supplied from a closed-loop controller, the SRM having an SRM drivetrain including a load mechanically coupled to a rotor of the SRM;

measuring machine-induced vibrations from the SRM drivetrain on at least one axis, using a vibration sensor;

determining an angular position of the rotor using an angular position sensor;

receiving phase current feedback from a current measurement device coupled to stator windings of the SRM;

extracting torque harmonic information from the measured machine-induced vibrations, based on the angular position of the rotor;

estimating a base current, based on the phase current feedback and the angular position of the rotor;

determining a harmonic current command by performing a gradient descent analysis to minimize a cost function, wherein the cost function is based on the torque harmonic information; and automatically modifying the machine-induced vibrations by incorporating, using the controller, the harmonic current command into the drive current.

16. The method of claim 15, further comprising:

calculating an electromechanical imbalance factor from the base current and the torque harmonic information; and incorporating, using the controller, the electromechanical imbalance factor into the drive current.

17. The method of claim 15, wherein performing the gradient descent analysis to minimize the cost function comprises a control objective selected from the group consisting of (a) minimizing torque ripple and (b) biasing the SRM toward a desired torque harmonic profile.

18. The method of claim 15, wherein performing the gradient descent analysis to minimize the cost function comprises limiting the harmonic current command to be less than a maximum allowable root-mean-squared value.

19. The method of claim 15, further comprising automatically reducing a step size of the gradient descent analysis as torque ripple harmonics are reduced.

20. The method of claim 15, further comprising:

determining a phase advancement angle from the torque harmonic information and the phase current feedback; and driving the SRM using the drive current and the phase advancement angle.

21. The method of claim 15, further comprising:

controlling the drive current using asymmetric hysteresis current control, wherein a turn-on bandwidth and a turn-off bandwidth are automatically controlled such that a greater restriction is imposed on a faster-changing current direction.

22. A method for mitigation of machine-induced vibration and noise in a switched reluctance machine drivetrain, the method comprising:

driving a switched reluctance machine (SRM) using a drive current supplied from a closed-loop controller, the SRM having an SRM drivetrain including a load mechanically coupled to a rotor of the SRM;

measuring machine-induced vibrations from the SRM drivetrain on at least one axis, using a vibration sensor;

receiving phase current feedback from a current measurement device coupled to stator windings of the SRM;

receiving phase voltage feedback from a voltage measurement device coupled to the stator windings of the SRM;

calculating an angular position of the rotor based on the phase current feedback and phase voltage feedback;

extracting torque harmonic information from the measured machine-induced vibrations, based on the angular position of the rotor;

estimating a base current, based on the phase current feedback and the angular position of the rotor;

determining a harmonic current command by performing an gradient descent analysis to minimize a cost function, wherein the cost function is based on the torque harmonic information; and automatically modifying the machine-induced vibrations by incorporating, using the controller, the harmonic current command into the drive current.

23. The method of claim 22, further comprising:

calculating an electromechanical imbalance factor from the base current and the torque harmonic information; and incorporating, using the controller, the electromechanical imbalance factor into the drive current.

24. The method of claim 22, wherein performing the gradient descent analysis to minimize the cost function comprises a control objective selected from the group consisting of (a) minimizing torque ripple and (b) biasing the SRM toward a desired torque harmonic profile.

25. The method of claim 22, wherein performing the gradient descent analysis to minimize the cost function comprises limiting the harmonic current command to be less than a selected maximum.

26. The method of claim 22, further comprising automatically reducing a step size of the gradient descent analysis as torque ripple harmonics are reduced.

27. The method of claim 22, further comprising:
   determining a phase advancement angle from the torque harmonic information and the phase current feedback; and
   driving the SRM using the drive current and the phase advancement angle.

28. The method of claim 22, further comprising:
   controlling the drive current using asymmetric hysteresis current control, wherein a turn-on bandwidth and a turn-off bandwidth are automatically controlled such that a greater restriction is imposed on a faster-changing current direction.

* * * * *